United States Patent

Novak et al.

[15] 3,692,396
[45] Sept. 19, 1972

[54] SPLIT IMAGE MOTION PICTURE PROJECTOR AND FILM THEREFOR

[72] Inventors: Vincent F. Novak, 155 Laurel Road, Princeton, N.J. 08540; John William Mason, R.D. 2, Warren Lane, Hopewell Junction, N.Y. 12533

[22] Filed: Aug. 26, 1970
[21] Appl. No.: 67,163

[52] U.S. Cl. .................................. 352/221, 95/38
[51] Int. Cl. ........................................ G03b 1/48
[58] Field of Search....352/79, 80, 83, 221, 226, 229, 352/230, 59; 95/38

[56] References Cited

UNITED STATES PATENTS

| | | |
|---|---|---|
| 1,112,270 | 9/1914 | Currie .................... 352/83 |
| 1,226,838 | 5/1917 | Wolber .................... 95/36 |
| 2,148,493 | 2/1939 | Nowland .................. 352/83 |
| 3,168,859 | 2/1965 | Mast ...................... 95/38 |
| 3,212,837 | 10/1965 | Beyer ..................... 352/72 |
| 3,471,223 | 10/1969 | Langone ................. 352/83 X |

*Primary Examiner*—Samuel S. Matthews
*Assistant Examiner*—Fred L. Braun
*Attorney*—Borst & Borst

[57] ABSTRACT

A conventional motion picture projector which has been adapted to receive and project a specially prepared film. The projector and film combination are capable of playing an entire feature length film lasting ninety minutes or so and employing but a single reel whether the projector is of the reel-to-reel or continuous loop type. The film is so prepared that each frame has a pair of independent image composites which are separately and serially projected. The projector is adapted to project the film due to a shutter in its lens system which permits only one of the image composites to be projected at any one instant of time, the shutter being capable of either manual or automated operation.

1 Claim, 8 Drawing Figures

INVENTORS
Vincent F. Novak
John William Mason
BY
Borst & Borst
ATTORNEYS

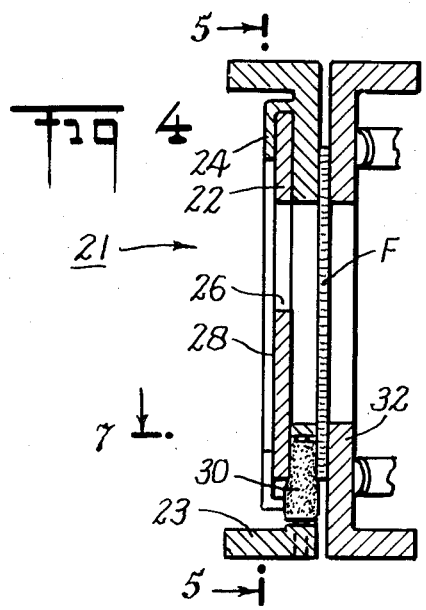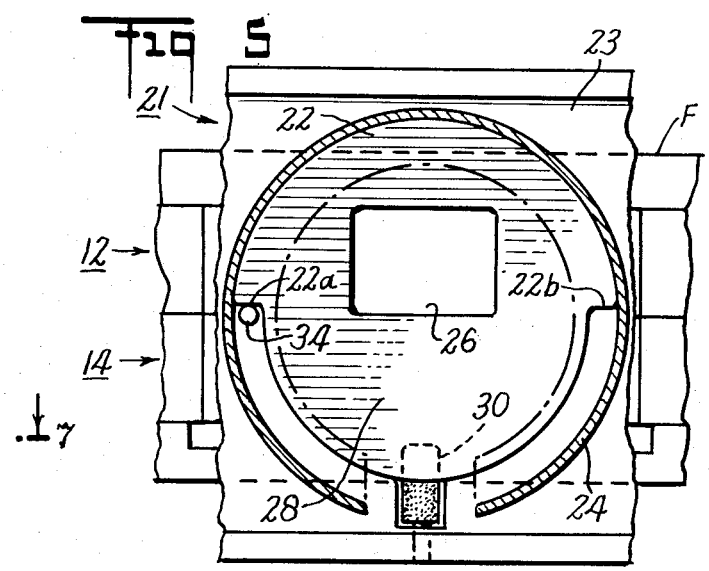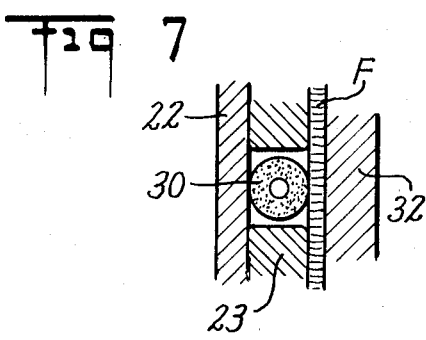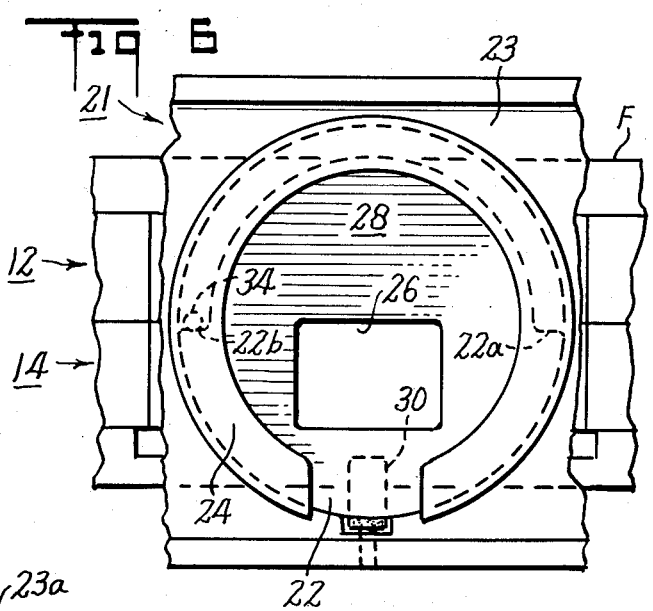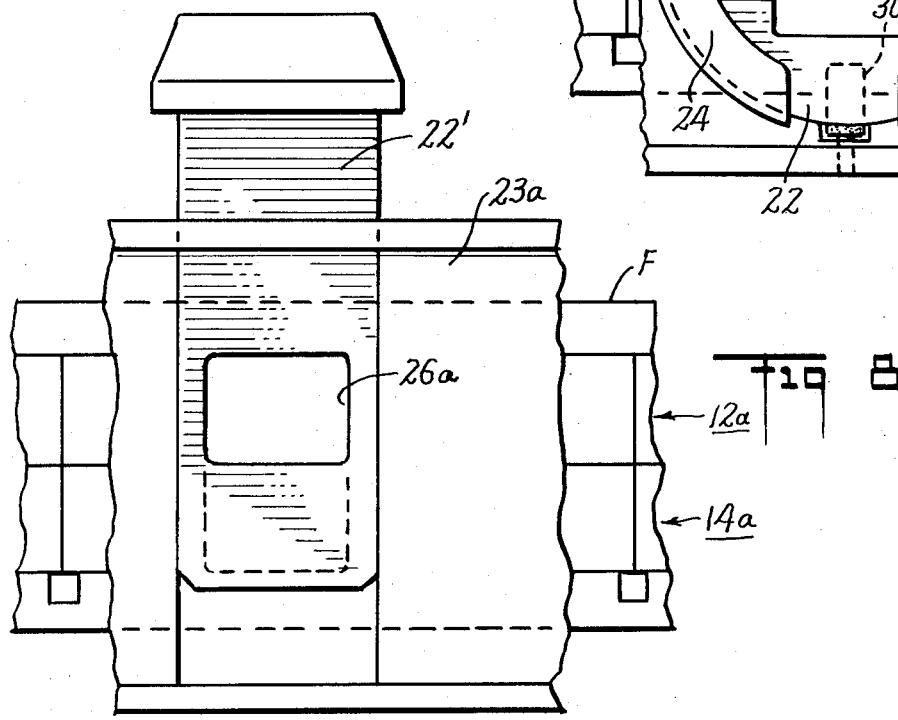

SPLIT IMAGE MOTION PICTURE PROJECTOR AND FILM THEREFOR

This invention relates to the photographic arts and to motion picture film and its means for projection in particular.

Conventional movie film is divided into frames, each frame bearing images composing a single scenario across nearly frame entire width of the film. A magnetic sound track is disposed along one longitudinal edge of the film, the film being balanced along the opposing edge by additional thickness of material. According to the present invention a film is provided having split or half frames, each half frame bearing projectible images comprising a complete scenario independent of that composed by the images in its opposing or other half frame. The half frames in one row and the half frames in the other row have their own corresponding sound tracks.

As described below the projector through which the film is run is provided with a shutter which permits only one row of images to be projected at a time.

One object of the invention is to provide a motion picture film which for a given length thereof will provide at least twice as many frames as that provided by conventional films.

Another object of the invention is to provide a projector capable of storing and projecting the picture and sound from a film prepared according to this invention.

Other objects and advantages of the invention may be perceived on reading the following detailed description of one of its embodiments which is taken in accordance with the accompanying drawings, in which:

FIG 4 is an enlarged section taken on line 4—4 of FIG. 1 showing the improved film gate;

FIG. 5 is a view partially in section taken on line 5—5 of FIG. 4;

FIG. 6 is similar to FIG. 5 showing the film gate set for reverse operation of the projector;

FIG. 7 is an enlarged section taken on line 7—7 of FIG. 4; and

FIG. 8 illustrates a modified film gate having a manually operated shutter for continuous loop projection.

Figure 1:
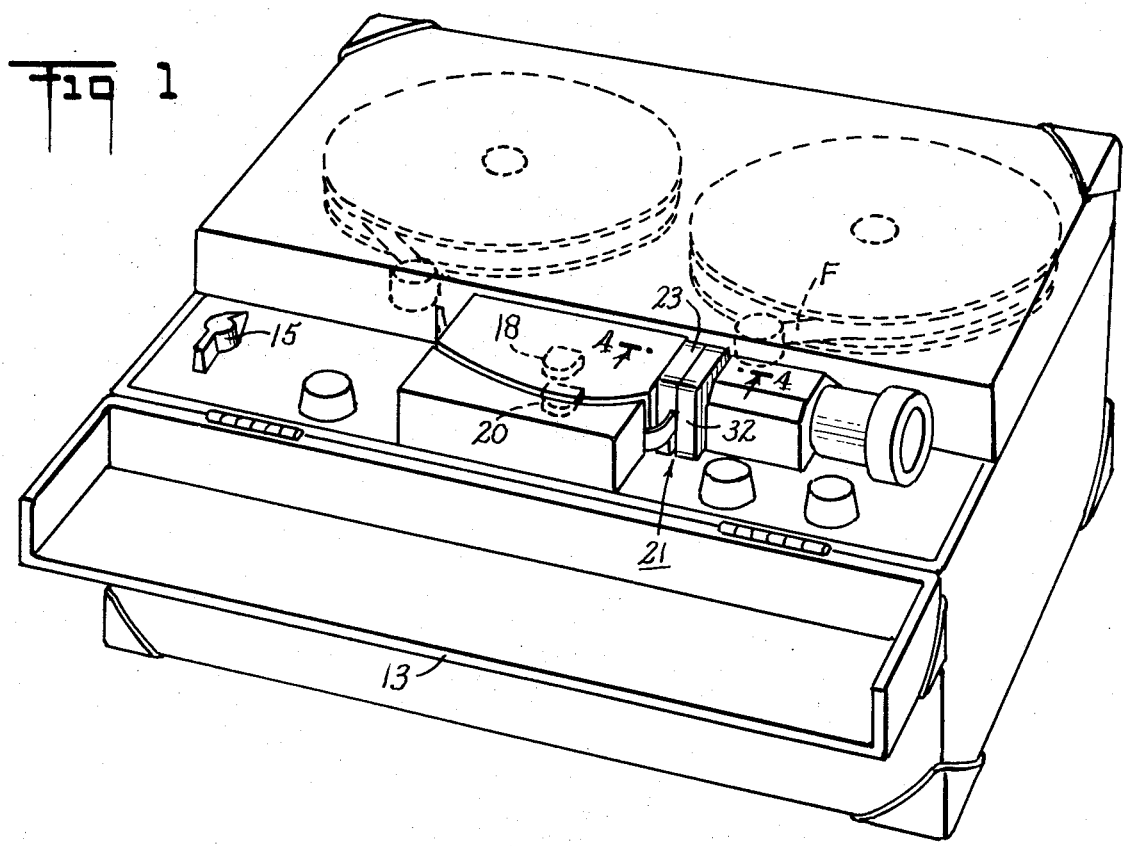
FIG. 1 is a perspective view of a projector with its lid open permitting access to its control knobs.
Figure 2:
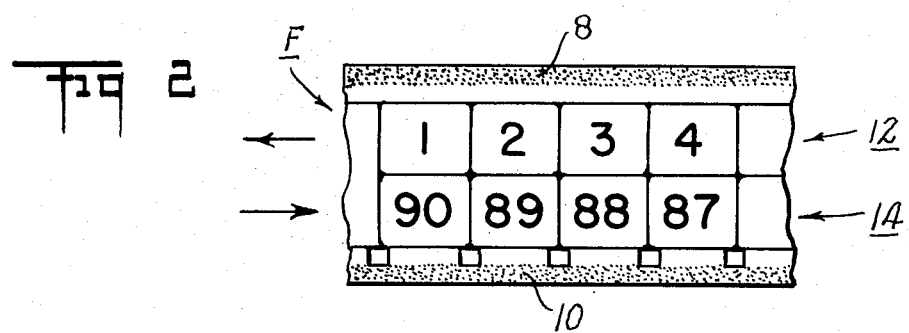
FIG. 2 illustrates an enlarged fragmentary portion of film made according to the invention for reel-to-reel operation.

Referring to the drawings, film capable of sound projection in a super 8 motion picture projector is shown in FIG. 2. As there shown each longitudinal edge of the film is provided with a magnetic sound track, track 8 being disposed along one edge thereof and track 10 along its opposite edge. Corresponding to the track 8 is a series of half frames numbered 1, 2, 3, 4 comprising an image row 12. Half frames 90, 89, 88, 87 are combined respectively with half frames 1, 2, 3, 4 to form a separate and independent image row 14. Such a film would be employed in reel-to-reel projection where at the end of the projection of the image row 12, the projector is automatically stopped and a switch knob 15 on opening lid 13 as shown in FIG. 1 is turned to restart the projector and run the reels in reverse direction. The last half frame in the image row 12 is adjacent to and above the first half frame in image row 14. As shown in FIG. 1 the reels are confined in a compartment to which the user is not expected to have access.

Multiple playback heads are well known in the tape recording arts. In the motion picture projector shown in FIG. 1, head 18, scanning track 8 is energized to play back when the film is run in one direction and head 20, scanning track 10 is energized in the reverse film direction.

Film gate 21, as shown in FIG. 4, comprises a fixed plate 23 on which shutter disc 22 is rotatably mounted on circular guide 24.

The shutter disc 22 has stop shoulders 22a and 22b, aperture 26 and a masking portion 28. The disc 22 is rotatable on circular guide 24 to move aperture 26 from an upper position exposing image row 12, as shown in FIG. 5 to a lower position to align it with the image row 14 as shown in FIG. 6.

As shown in FIG. 4 and FIG. 7, roller 30 rotatably mounted on plate 23 frictionally engages the disc 22 on one side and also an edge of the film F on its opposing side, the film F exerts pressure against the combination due to pressure plate 32. The aperture 26 is held in position with respect to the image row by engagement of the stop shoulders against stop pin 34 mounted on the plate 23. In one direction of the film through the projector the disc 22 is rotated to the position shown in FIG. 5 with shoulder 22a against the pin 34 after which the film slips over the roller 30. In the reverse direction roller 30 causes the disc 22 to rotate until stop shoulder 22b encounters the stop pin 34 as shown in FIG. 6.

Figure 3:
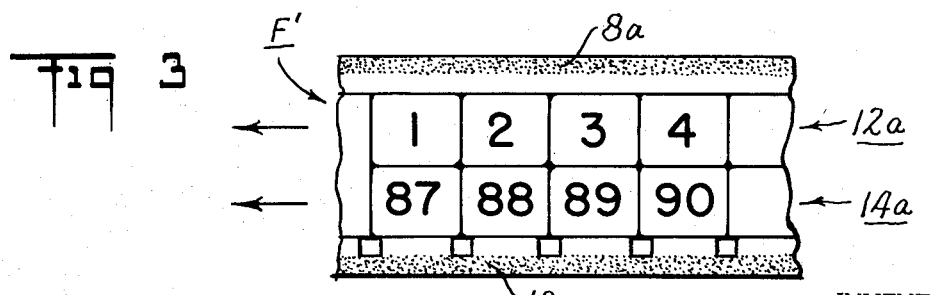
FIG. 3 is a fragmentary portion of film prepared in accordance with the invention for continuous loop operation.

A manually operated shutter 22' slidable in plate 23a to properly position its aperture 26a with respect to the image rows is shown in FIG. 8. This arrangement is designed in particular for continuous loop film projection in which the film is not rewound but comes to an automatic stop at the end of the first image row due to a signal built into its sound track and continues in the same direction to project the second image row. Film F', as shown in FIG. 3 is prepared for continuous loop projection and comprises image rows 12a and 14a the individual half frames of which are serially arranged in the same direction relative to the film and sound tracks 8a and 10a.

It is to be noted because the supply and take-up reels, as shown in FIG. 1, are disposed horizontally which requires that the images be turned 90° from their conventional positions on motion picture film.

Various modifications of the invention may be effected by persons skilled in the art without departing from the scope and principle of the invention as defined in the appended claims.

What is claimed is:

1. In a motion picture projector, a shutter comprising a disc having a masking portion and an apertured portion, means for rotatably mounting said disc, said disc having a pair of detents, a motion picture film having adjacent image rows and arranged to traverse in close proximity to said shutter, a stop adapted selectively to engage said detents on the disc and thereby determine the rotative position of the apertured portion of said disc relative to said film according to the image row on the film which is to be exposed through said apertured portion, there being a roller provided between and in contact with said film and said disc and a pressure plate urging said film against said roller, said stop being mounted on said pressure plate, whereby traversal movement of said film automatically positions one of said detents against said stop depending on the direction of movement of the film through the projector.

* * * * *